*INVENTOR.*
EUGENE H. LESLIE.
BY

ATTORNEYS.

Oct. 3, 1961 E. H. LESLIE 3,002,822
DIRECT-FIRED HEAT KETTLE
Original Filed Dec. 29, 1952 2 Sheets-Sheet 2

INVENTOR.
EUGENE H. LESLIE.
BY
ATTORNEYS.

3,002,822
DIRECT-FIRED HEAT KETTLE
Eugene H. Leslie, Ann Arbor, Mich., assignor to Blaw-Knox Company, Pittsburgh, Pa., a corporation of Delaware
Continuation of application Ser. No. 328,308, Dec. 29, 1952. This application Aug. 9, 1956, Ser. No. 603,857
1 Claim. (Cl. 23—290.5)

This invention relates to kettles used industrially, and is for a kettle which is directly fired but which may be closely controlled as to time and temperature of the cooking of the contents.

Many products, such as linseed oil, varnish, alkyd resins and ester gums are prepared for use by cooking batches of the product in kettles, and the time and temperature must be closely controlled to secure the desired properties in the finished product. The least expensive and most simple equipment is a simple direct-fired kettle, but there is always danger of local overheating of the product at hot spots on the kettle wall due to non-uniform distribution of heat, or the product is cooked too long by reason of the residual heat stored in the fire box and kettle support after active firing has ceased. Variations in the product and the need to meet increasingly rigid specifications have led to the use of electrically-heated kettles, and to indirectly-heated double-jacketed vessels, wherein vapors or circulated hot liquids of predetermined temperatures are used as heating media. A major objection to such equipment is its high cost.

The purpose and object of the present invention is to provide a direct-fired kettle of unique construction which gives substantially uniform distribution of heat application and adequate control of time, temperature and rate of heat delivery. This enables a satisfactory kettle installation to be made at a greatly reduced capital investment, which is a very important factor, because it necessarily reflects a saving in the cost of manufacture of such products as are produced by the equipment.

When heat is applied to the outside of a vessel, it flows through the metal wall to the film of liquid on the inside of the vessel. Here it is transferred through the film to the bulk liquid contained in the vessel, the rate of heat flow being determined by the temperature difference, the properties of the liquid in the kettle, and the agitation or movement of such liquid with respect to the interior surface of the kettle. The metal shell of the vessel and the film of liquid immediately adjacent to it will be at a higher temperature than the bulk of the liquid in the vessel. However, in the heat treatment of liquids under consideration there is a limiting permissible temperature of around 650–675° F. above which the metal shell and liquid film should not rise, because thermally destructive reactions will occur in the liquid of the film, with the result that the properties of the product are deleteriously affected. Although the quantity of the liquid in the film next to the metal shell is small at any time, most of the liquid sooner or later circulates through the film next to the shell and can thus be deleteriously affected if the shell temperature is too high.

The heat supplied to the kettle may be from a solid, liquid or gaseous fuel. For reasons to be made apparent, it is desirable to use a liquid fuel, such as fuel oil. When fuel oil is burned, part of the net heat energy of the fuel is transmitted from the flame as radiant energy and part remains as sensible heat contained in the gaseous products of combustion. The distribution of the total net heat of the fuel as between radiant energy and sensible heat is determined by the environment in which the fuel is burned and by the quantity of air used for combustion. The radiant energy emanates in all directions from the radiant source, and is partly absorbed and partly reflected by the solid surfaces upon which it impinges. The reflected portion impinges upon other surfaces where it is partly absorbed and partly reflected. The net overall effect is that the radiant energy will be absorbed by those surfaces that are transmitting heat, as, for example, the vessel in which heat is being absorbed through heating of the liquid within, or the walls of the combustion chamber which are conducting heat to their outer surfaces and dissipating it to the atmosphere. The sensible heat of the combustion gases is transferred from the gases through the surfaces of solids that are cooler than the gases by the processes of convection and conduction.

The usual direct-fired kettles are so constructed that the bottom of the kettle is close to the flame where it may be intensely heated and the side walls of the setting for the kettle are of refractory, shadowed from the flame area directly beneath the kettle and which confine the flow of hot combustion gases between the kettle and the side walls, so that the side walls of the combustion chamber receive a negligible amount of heat by direct radiation from the flame under the kettle and the radiant energy of the flame is concentrated on the bottom of the kettle. The refractory walls eventually absorb sufficient heat from the combustion gases to reradiate heat to the confronting kettle walls, but they then also constitute a substantial heat reservoir to reradiate heat to the kettle for a sustained period of time after the flame is turned off or lowered. Consequently close time-temperature control of heat transmitted to the kettle is not obtainable in conventional kettles. Although it was desired that such kettles should utilize the sensible heat of the combustion gases, they are inefficient in this respect since the small area of the kettle exposed to the gases creates a condition unfavorable to the utilization of convective heat and a large amount of heat is wasted. As will hereafter more fully appear, the present apparatus is designed to utilize the heat as radiant energy in an effective manner and heat carried away by convection is thereby reduced.

The heat absorbed radiatively by any given vessel varies with the flame temperature, the vessel wall temperature, and the rate of firing expressed as net heat in the fuel per unit area of projected vessel surface. For example, if firing at the rate of 45,000 B.t.u. net heat in fuel per square foot of projected vessel area and supplying theoretical air for combustion, the percent of the net heat in the fuel transmitted by radiation will be approximately 52%. If, however, the rate of firing is only 15,000 B.t.u. net heat in the fuel per square foot of projected vessel surface the radiant transmission will be approximately 68% of the net heat in the fuel. Both of these rates apply to a vessel, the absorbing surface of which is at about 650° F. In the first case the heat transmitted will be approximately 23,400 B.t.u./hour/sq. ft. and in the second case 10,200 B.t.u./hr./sq. ft.

In a typical case with good agitation inside the vessel the inside film heat transfer coefficient will be 35–40 B.t.u./sq. ft./hr./1° F.

Taking the value of $h_i=38$, the temperature difference between the vessel wall and the liquid in the vessel in the two cases described will be $$\frac{23,400}{38}=615° \text{ F. and } \frac{10,200}{38}=268° \text{ F.}$$

If the liquid content of the vessel were at a bulk or average temperature of 350° F., it is then obvious that the liquid film on the inside of the vessel would in the two cases be subjected to temperatures of 965° F. and 618° F. respectively. The latter temperature 618°

F. is safe and will do no harm. However, the temperature 965° F. is so high as to cause thermal decomposition of any organic material.

As mentioned above, in conventional kettles, the setting for the kettle is low, bringing the kettle bottom close to the flame, and being low, its area is relatively small compared to the exposed area of the kettle. The high radiant transmission of heat occurs on that part of the vessel surface that is close to the flame. This follows because the intensity of radiation varies as the reciprocal of the square of the distance between the radiation source and the receptive surface. Moreover, conventional practice has dictated the use of a ceramic refractory lining in the fire box under the kettle. Such a lining at relatively low temperatures is highly absorbtive of radiant heat, and by the same token is a poor reflector of heat. Thus, in conventional kettles, conditions combine to locally overheat the contents of the kettle immediately against its interior surface; that is, proximity of the flame to the kettle, the small area of the combustion chamber with consequential high-heated walls, and the absorption of heat by the refractory introduces a "thermal inertia" into the heat supply side of the system and results in a serious transfer and reaction lag that defeats any attempt at accurate control, all tending towards such local overheating of the product.

The foregoing description of the phenomena involved has been concerned with liquid fuel. The same principles apply to solid fuels. However, for small heat loads it is not convenient to use solid fuels for heating operations in which close control of heat transmission rates is required. Gaseous fuels, such as natural gas, when burned, emit far less radiant energy than liquid fuels, and therefore cannot be used as effectively as liquid fuels in heating operations where the larger part of the energy is to be transmitted radiatively unless special and expensive burners are used for which reason I have herein referred particularly to fuel oil burners.

Not only is controlled heating as to temperature and time a requisite for satisfactory processing of organic material for which kettles of this nature are used, but in most cases after the material has been heated to the required extent it evolves heat when polymerization and resin formation begins, that is, the reaction becomes exothermic. Hence controlled heating is necessary in the early stages, and controlled cooling may be required in the later stages.

The present invention provides a direct-fired vessel, autoclave or kettle, and a setting therefor, in which the heat absorbing area of the vessel projects into a combustion chamber constituted mainly of a thin envelope of stainless steel sheet metal which is highly reflective to radiant heat at temperatures below 1000° F. and which, because of its good reflectivity and low mass, has little heat absorbing and retaining properties. It may be quickly brought to operating temperature and quickly cooled from maximum temperature.

Cooling can be accelerated by blowing air into the combustion chamber, or if more drastic cooling is required, a fog of water vapor may be used. To minimize external heat loss, this thin shell is in turn encased in a low bulk density high thermal insulating mass, which, because of its low bulk density, provides a small heat absorbing mass together with a high degree of thermal insulation.

To accomplish the objects of the invention it is necessary to utilize a reaction vessel of sufficient capacity to hold the materials to be reacted with ample outage for frothing and vapor separation and equipped with a stirrer or agitator so powered as to permit effective agitation and rapid movement of the liquid within the vessel, in order that the film heat-transfer coefficient between the inside of the vessel shell and the liquid shall be 35 B.t.u./ft.$^2$/hr./1° F. or higher. The reaction vessel is supported within the combustion chamber so that only that portion of the vessel that is filled with liquid is subjected to heat flow either from radiation, or convection and conduction.

The position of the vessel in the combustion chamber and the size and disposition of the chamber are essential to achieving the desired results. The bottom of the reaction vessel should be relatively high above the axis of the flame so as to reduce the intensity of the radiation from the flame itself. The ratio of the interior surfaces of the walls, floor and roof of the combustion chamber to the exposed surface of the reaction vessel should be properly proportioned. The inside surface of the combustion chamber, that is, the re-radiating surfaces, should be symmetrically disposed with respect to the reaction vessel surfaces that receive heat. Thus every unit area of the reaction vessel surface will have a substantial and equal opportunity to receive heat by radiation and in some minor degree by convection and conduction.

The burner used should be of such design as to supply substantially the theoretical quantity of air for combustion of the fuel, that is to produce a flame of maximum possible temperature for the purpose here described so that the maximum proportion of the net heat of the fuel shall be emitted radiatively from the flame and the minimum proportion of the net heat in the fuel shall appear as sensible heat of the combustion gases. Secondary air for combustion shall not be used, or, at worst, shall be that minimum amount which from practical considerations cannot be excluded.

With the foregoing explanation in view, my invention may be further illustrated and described by reference to the accompanying drawings, in which.

Figure 1:
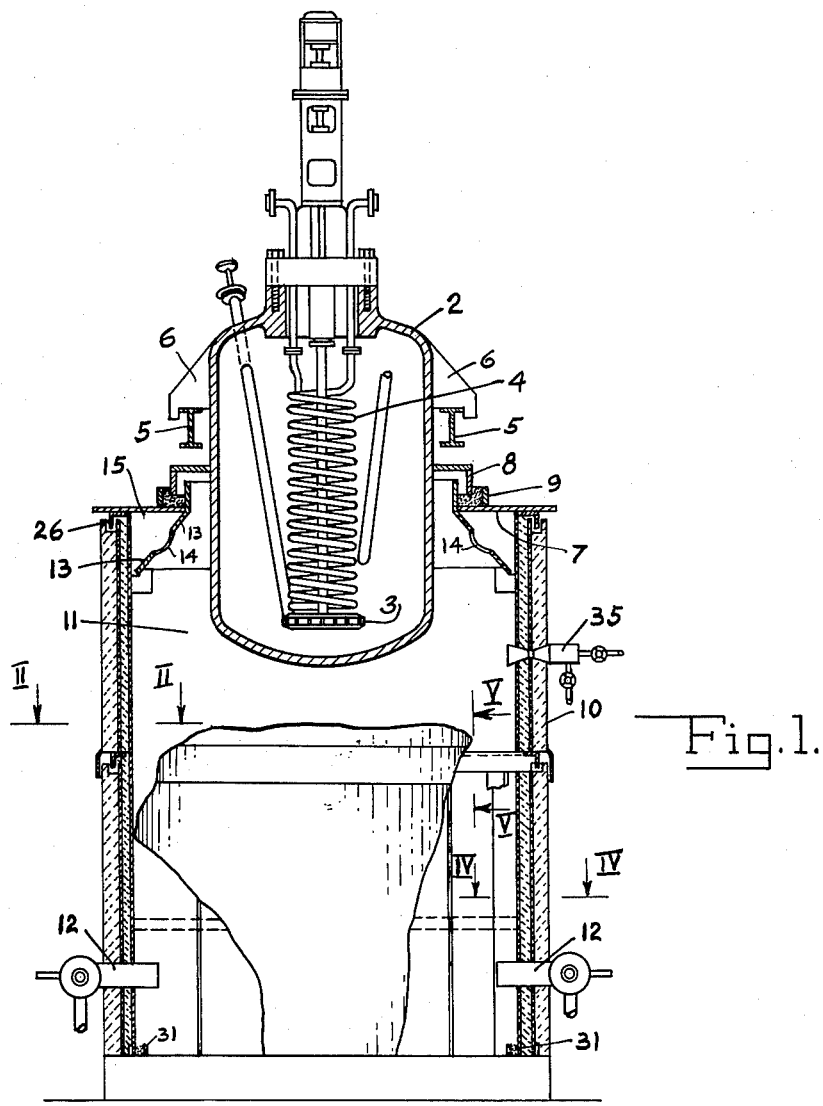
FIG. 1 is a view in elevation with parts shown in section of a direct-fired autoclave embodying the present invention, the burners, for purposes of illustration, being slightly removed from their exact locations which are more correctly shown in FIG. 6 but which otherwise shows the parts in proper geometrical relation.
Figure 2:
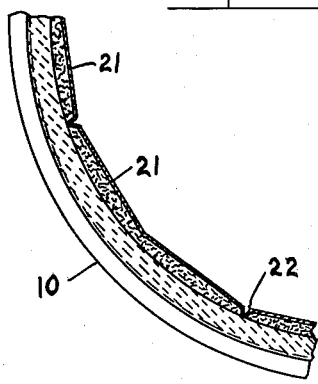
FIG. 2 is a vertical sectional view taken on the line II—II of FIG. 1, illustrating the radiation heating furnace wall construction.
Figure 3:
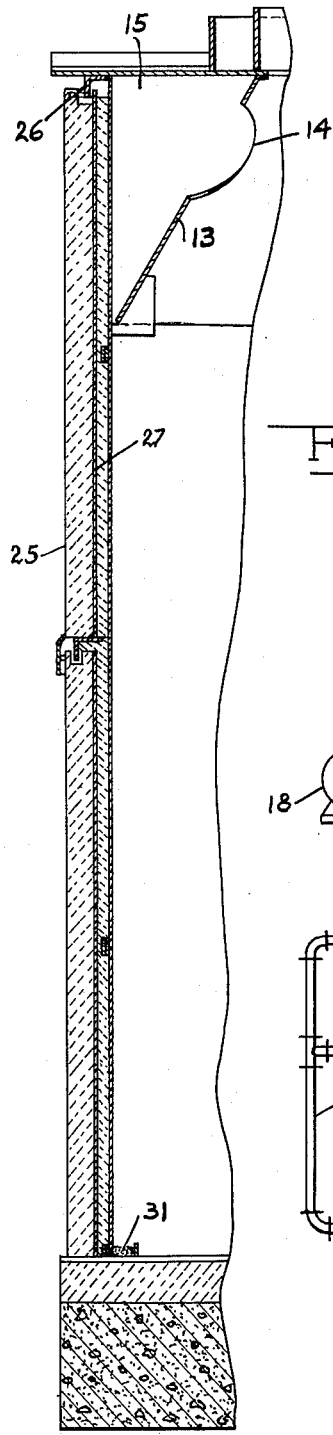
FIG. 3 is a detail vertical sectional view of the radiation heating furnace wall construction.

In the drawings, 2 designates the vessel or kettle. It is here illustrated as an autoclave of pressure-tight construction, having a motor-driven agitator 3 thereon, and having a coil 4 through which cooling fluid may be circulated. The vessel, however, may be any known or preferred construction and per se constitutes no part of the present invention. The autoclave is supported on parallel I-beams 5 by means of exterior lugs 6 on the autoclave which rest on these beams. These beams 5 are supported in turn on a load-bearing structure (not shown).

The body of the autoclave projects through an opening in the top 7 of a combustion chamber shell. The autoclave has an annular skirt 8 extending into an annular sand trough 9 formed on the top 7 of the combustion chamber. The purpose of this sand seal is to have the chamber and autoclave structurally independent while forming a closure against the escape of combustion gases.

There is a chamber shell 10 on which the top 7 is carried, and within which is a combustion chamber 11. The lower end of the autoclave projects into this combustion chamber.

In the bottom of the chamber are fuel burners, preferably for burning fuel oil. I have shown two such burners 12 which are spaced 180° apart, and which are approximately tangential to, but in a plane well below, the autoclave. The axis of the burners is horizontal, and they are preferably adjusted to burn with just the proper amount of air which is introduced through the burners with a minimum of secondary air. Burners such as those used for domestic purposes are satisfactory. These have a fan for supplying combustion air, a pump for the oil, an atomizing nozzle, and an igniter. Typically, each is capable of burning around five to six gallons of fuel oil per hour. They should, as indicated, be adjusted to burn without secondary air, and should be adjusted so that they produce a slight smoke and will deposit soot on the interior of the combustion chamber. When so adjusted they constitute luminous flame burners yielding a large percentage of the fuel energy as radiant heat.

Under the top 7 of the chamber shell is an annular indirect baffle 13, with several ports 14 therethrough, forming an offtake passage 15 or flue ring for products of combustion. A duct 16 carries the gases through a heat exchanger 17 where combustion air, supplied by blower 18, is preheated before it is led through pipes 19 to the burners. The fuel supply pipes to the burners are designated 20.

The chamber shell is of a generally cylindrical form with a sheet metal lining 21 which may be polygonal instead of fully circular, and vertical corrugations 22 may be formed at intervals thereabout to allow for expansion and contraction, and to give rigidity to the structure. The lining 21 is surrounded by a low bulk density thermal insulating material 23.

Magnesia oxide, or other low bulk density materials available for use at the temperatures here encountered may be employed.

Outside the insulation 23 are heat insulating blocks 24 forming a load-sustaining wall. Wire netting 25 covered with a spray coat of heat insulating cement forms the outside skin of the shell.

Figure 4:
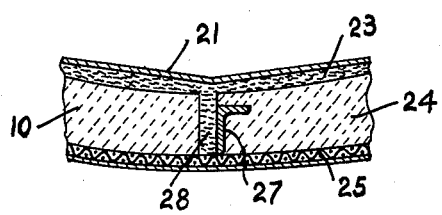
FIG. 4 is a horizontal sectional view of the furnace wall taken on the line IV—IV of FIG. 1.
Figure 5:
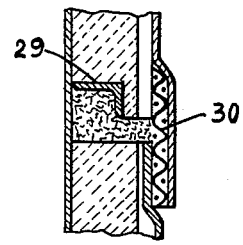
FIG. 5 is a vertical sectional view of the furnace wall taken on the line V—V of FIG. 1.
Figure 6:
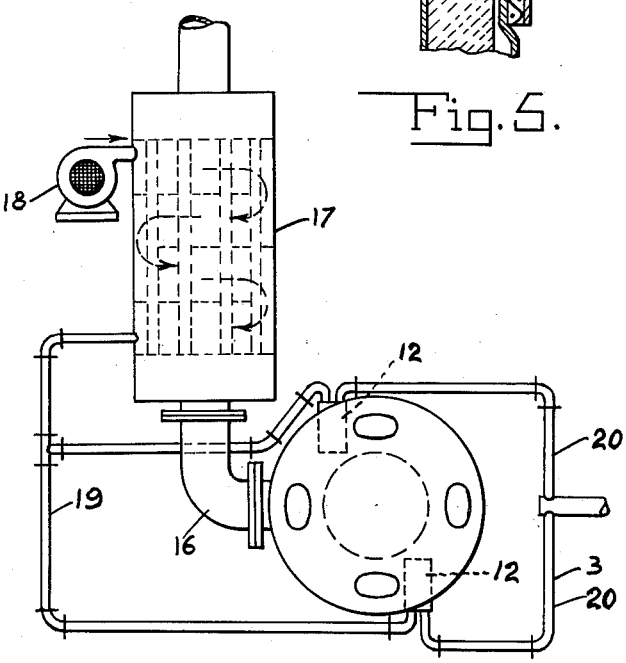
FIG. 6 is a diagrammatic top plan view of the kettle furnace, the autoclave being omitted, to show the fuel burners and the air preheating recuperator.

There may be an annular flange 26 on the cover 7 projecting into an annular groove in the top of the refractory to close the shell against escape of products of combustion. There may be metal angle bars 27 built into the wall and extending vertically, and as shown in FIG. 4, the insulating brick may be separated to provide one or more vertically-extending expansion gaps 28 which are also filled with the insulation 23. If desired, there may be a flanged ring 29 similar to member 26 on the cover, and the continuity of the refractory brick may be interrupted below this ring, as shown in FIG. 5. The wire sheathing on the outside provides a telescoping joint at 30. This arrangement takes care of expansion stresses vertically. There is a sand seal at 31 where the shell sets on the foundation 32.

The exact structure of the shell is subject to wide variations in design and construction, but the sheet metal interior is a heat-resisting alloy, such as stainless steel, which is also a good reflector or reradiator of heat in the range of temperatures here encountered. It is thin so as to be of low mass per unit area. Sixteen gauge stainless steel is satisfactory for the lining, and the baffle and cover should also be of stainless steel. The lining should have good heat reflecting or radiating qualities, and as little mass for heat retention as practical.

Important in the construction is the fact that only that portion of the vessel which is normally full of liquid projects into the combustion chamber. Secondly, the ratio of heat radiating surface in the combustion chamber to the area of the vessel that projects into the combustion chamber in relation to the firing rate must be such as to distribute the heat over the entire lower portion of the kettle within the combustion chamber while avoiding excessive heating of any one area by radiation directly from the flame and by reradiation from one wall surface to the other, and to this end the area of the combustion chamber walls below the bottom of the kettle and above the bottom of the combustion chamber exceeds the area of the combustion chamber walls above the bottom of the kettle and below the cover. This large area of the combustion chamber walls below the kettle in conjunction with the bottom of the combustion chamber provides for the effective diffusion of the heat by radiation and reradiation to the entire lower portion of the kettle within the combustion chamber. Also the furnace shell must be high enough so that the bottom of the autoclave is well above the zone of the direct flame. The burners are of course close to the bottom of the furnace setting and the kettle is concentrically and symmetrically arranged with respect to the shell of the furnace, well above the flames. As a further guide to those skilled in the art, the structure is designed so that if the ratio of heat absorbed in the kettle is 60% or higher of the total net heat in the fuel burned, 80% or more of the total heat absorbed in the kettle should be transmitted by radiation, and 20% or less would be supplied by convection and conduction.

To further guide others in practicing my invention, reference may be made to the accompanying drawing showing a specific embodiment of my invention. It may be seen from this drawing that if a straight line be drawn upwardly from the vertical center line of the shell at the level of the burners said line being tangent to the lower corner of the kettle, where its side walls join to the bottom, such line will intersect the wall of the combustion chamber well above the level of the kettle bottom and even reach the cover. Further, if two such lines be projected in diametrically opposite directions they will define between them an acute angle. By virtue of this relation, the top edge of the sheet metal shell can "see" the flame area below the kettle in the region of the center of such area at the level of the burner. In other words, the flame may radiate heat in all directions against the entire inner surface of the shell from top to bottom, and even those areas surrounding the kettle may receive direct radiation from the flame area under the center of the kettle, and heat may also be transferred by reradiation from one area of the shell to another to eventually reach the kettle.

The burner capacity is such as to generate more heat than the kettle requires during the reaction period so that in the initial period of operation, extra heat is available for bringing the vessel up to reaction temperature in order to substantially reduce the overall time for processing the contents of the kettle. Also, the burners can be adjusted as the cooking or processing of the material in the autoclave progresses. The rate of heat transfer from the vessel to its contents will be lower when the contents are cold and more viscous, increase as the contents become hotter and less viscous, and decrease as resins and polymers begin to form, at which point the amount of heat supplied can be very small. Fuel oil is used because it is more easily controlled than solid fuel, and when burned without excess air, radiates more of its total heat than gas.

As schematically indicated at 35, there may be one or more nozzles for introducing either cooling air or for producing a fog-like spray, depending upon the rate of cooling required. So-called "fog" nozzles are available for this purpose.

My invention provides therefore a direct-fired kettle. Temperature can be readily controlled because of the use of radiant heat, and the relatively low heat storage capacity of the furnace. The unit gives a direct-fired operation which can give a controlled processing of the contents of the vessel comparable to those obtainable in far more expensive vapor-heated kettles or electrically heated installations.

This application is a continuation of my copending application Serial No. 328,308, filed December 29, 1952, now abandoned.

I claim:

A direct-fired liquid heating apparatus of the class described comprising a vertical generally cylindrical sheet metal shell defining the interior of a combustion chamber, the shell being of thin gauge sheet metal whereby it has a low heat-retention capacity, a jacket of low bulk density insulation surrounding and encasing the sheet metal shell and also having a low heat-retention capacity whereby the temperature of the shell may be rapidly raised or lowered, a bottom for the shell, a metal cover for the shell, a kettle having a bottom and vertical side walls, the kettle being of less diameter than the shell and being centrally positioned in the cover with its lower end portion projecting through the cover into the interior of the shell below the cover and with its upper portion extending above the cover, there being a concentric annular clearance space between the side walls of the lower portion of the kettle and the interior of the shell whereby the kettle and the shell are symmetrically positioned about the vertical axis of the kettle and in spaced relation to each other, cooperating sealing means on the cover and the kettle for preventing the escape of gas from the combustion chamber between the kettle and the cover, means spaced outwardly from the kettle adjacent the top of the shell for removing combustion gases from the interior of the shell, a luminous flame burner projecting horizontally into the lower part of the combustion chamber at a level between the bottom of the kettle and the bottom of the combustion chamber and wherein the distance from the level of the burner to the bottom of the kettle is such that a straight line may be projected from the vertical center line of the combustion chamber at the burner level upwardly and outwardly tangent to the outside edge of the kettle bottom to the upper part of the combustion chamber and two such lines projected in diametrically-opposite directions from said point will define between them an acute angle with the entire area of the combustion chamber wall above the burner level being exposed to direct radiation from flame in the central area of the combustion chamber at the burner level directly under the central area of the kettle, such level being below that at which the horizontally-projected flame from the burner may contact the kettle, the distance from the bottom of the kettle to the bottom of the combustion chamber being greater than the distance from the bottom of the kettle to the cover to thereby provide an extensive heat-absorbing and re-radiating area below the kettle, the space between the burner and the kettle being open and unobstructed whereby radiant heat may be transmitted from the luminous flame generated by the burner directly to the bottom of the kettle and also to the inner surface of the metal shell from the top to the bottom thereof and to the bottom of the combustion chamber for reradiation to the shell and to the kettle.

References Cited in the file of this patent
UNITED STATES PATENTS

| | | |
|---|---|---|
| 522,586 | Cascaden | July 10, 1894 |
| 1,445,244 | Spaleck | Feb. 13, 1923 |
| 2,377,177 | Pfenner | May 29, 1945 |
| 2,399,318 | Bouldin | Apr. 30, 1946 |
| 2,450,095 | Seehold | Sept. 28, 1948 |
| 2,541,265 | McGregor | Feb. 13, 1951 |
| 2,548,177 | Tauber | Apr. 10, 1951 |
| 2,615,116 | Hayes et al. | Oct. 21, 1952 |

OTHER REFERENCES

Dare: "Heat Treating and Forging," Apr. 11, 1939, pp. 200–203 and 207.

Ind. and Eng. Chem., pp. 931–932, vol. 35, No. 9, Autoclaves for Pressure Temperature Reactions.